United States Patent
Harasawa et al.

(10) Patent No.: US 8,236,434 B2
(45) Date of Patent: Aug. 7, 2012

(54) MAGNETIC RECORDING MEDIUM, MAGNETIC SIGNAL REPRODUCTION SYSTEM AND MAGNETIC SIGNAL REPRODUCTION METHOD

(75) Inventors: Takeshi Harasawa, Kanagawa (JP); Masahito Oyanagi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 586 days.

(21) Appl. No.: 12/295,541

(22) PCT Filed: Mar. 30, 2007

(86) PCT No.: PCT/JP2007/057301
§ 371 (c)(1),
(2), (4) Date: Sep. 30, 2008

(87) PCT Pub. No.: WO2007/114395
PCT Pub. Date: Oct. 11, 2007

(65) Prior Publication Data
US 2009/0168265 A1 Jul. 2, 2009

(30) Foreign Application Priority Data
Mar. 31, 2006 (JP) .................................. 2006-099936

(51) Int. Cl.
*G11B 5/706* (2006.01)
(52) U.S. Cl. ........................................ 428/845; 428/842
(58) Field of Classification Search ................. 428/842, 428/845
See application file for complete search history.

(56) References Cited

U.S. PATENT DOCUMENTS

| | | | | |
|---|---|---|---|---|
| 2003/0113585 A1* | 6/2003 | Mori et al. | | 428/694 BH |
| 2004/0043257 A1* | 3/2004 | Doushita et al. | | 428/694 TC |
| 2004/0247859 A1* | 12/2004 | Sasaki et al. | | 428/329 |
| 2005/0238925 A1* | 10/2005 | Murayama et al. | | 428/840.1 |

FOREIGN PATENT DOCUMENTS

| | | |
|---|---|---|
| JP | 01-106329 A | 4/1989 |
| JP | 08-306032 A | 11/1996 |
| JP | 11-025442 A | 1/1999 |
| JP | 2000-195038 A | 7/2000 |
| JP | 2000-251243 A | 9/2000 |
| JP | 2001-067639 A | 3/2001 |
| JP | 2002-251710 A | 9/2002 |
| JP | 2003-016631 A | 1/2003 |
| JP | 2003-338023 A | 11/2003 |
| JP | 20004-030870 A | 1/2004 |

OTHER PUBLICATIONS

Official Japanese Office Action corresponding in Japanese Patent Application No. 2007-095539 dated, Oct. 6, 2009.

* cited by examiner

*Primary Examiner* — Holly Rickman
*Assistant Examiner* — Linda Chau
(74) *Attorney, Agent, or Firm* — Sughrue Mion, PLLC

(57) ABSTRACT

The present invention relates to a magnetic recording medium comprising a magnetic layer comprising a hexagonal ferrite powder and a binder on one surface of a nonmagnetic support and a backcoat layer on the other surface of the nonmagnetic support. A power spectrum density at a pitch of 10 micrometers ranges from 800 to 10,000 nm$^3$ on the magnetic layer surface, a power spectrum density at a pitch of 10 micrometers ranges from 20,000 to 80,000 nm$^3$ on the backcoat layer surface, the magnetic layer has a center surface average surface roughness Ra, as measured by an atomic force microscope, ranging from 0.5 to 2.5 nm, and the hexagonal ferrite powder has an average plate diameter ranging from 10 to 40 nm.

4 Claims, No Drawings

MAGNETIC RECORDING MEDIUM, MAGNETIC SIGNAL REPRODUCTION SYSTEM AND MAGNETIC SIGNAL REPRODUCTION METHOD

CROSS-REFERENCE TO RELATED APPLICATIONS

This application claims the benefit of priority to Japanese Patent Application No. 2006-099936 filed on Mar. 31, 2006, which is expressly incorporated herein by reference in its entirety.

TECHNICAL FIELD

The present invention relates to a magnetic recording medium, and more particularly, to a magnetic recording medium having excellent electromagnetic characteristics during high-density recording, and to a magnetic signal reproduction system and reproduction method employing the above magnetic recording medium.

BACKGROUND TECHNIQUE

In recent years, means for rapidly transmitting information at the terabyte level have undergone marked development. It has become possible to transmit data and images comprising huge amounts of information. With this improvement in data transmission technology has come demand for recording and reproduction devices and recording media for recording, reproducing, and storing information with greater recording capacity.

Recording tapes are employed in a variety of applications, including audio tapes, video tapes, and computer tapes. Particularly, in the field of data backup tapes, as the capacity of the hard disks being backed up has risen, backup tapes with a recording capacity of several tens to 800 GB per reel have been commercialized. Further, high-capacity backup tapes exceeding 1 TB have been proposed, and the achievement of high recording capacity in such tapes is essential.

In achieving high recording capacity, high recording density techniques such as the use of magnetic powder in the form of microparticles, the high density filling of coatings with such microparticles, the smoothing of coatings, and reduction of the thickness of the magnetic layer have been proposed as approaches from the aspect of magnetic tape manufacturing. For example, Japanese Unexamined Patent Publication (KOKAI) Heisei No. 8-306032 ("Reference 1" hereinafter, which is expressly incorporated herein by reference in its entirety) proposes the incorporation of a phosphorus-containing organic compound into the lower layer to enhance dispersion of inorganic powder in the lower layer and ensure the surface properties of the magnetic layer. Further, Japanese Unexamined Patent Publication (KOKAI) Heisei No. 11-25442 ("Reference 2" hereinafter, which is expressly incorporated herein by reference in its entirety) proposes that the spatial frequency strength be determined by the ratio of long wavelengths to short wavelengths as an indicator of the surface smoothness of the magnetic layer.

However, when the surface smoothness of the magnetic layer is increased, there is a risk that uneven winding will occur and running properties will deteriorate. Accordingly, to prevent winding unevenness and the deterioration of running properties, a backcoat layer comprising a granular substance such as carbon black is provided on the surface of the support on the opposite side from the magnetic layer (for example, see Japanese Unexamined Patent Publication (KOKAI) No. 2004-30870 ("Reference 3" hereinafter, which is expressly incorporated herein by reference in its entirety)).

The magnetic layer surface roughness Ra is widely employed as an indicator in evaluating the surface properties of the magnetic layer. By contrast, Reference 2 proposes that the spatial frequency strength be determined by the ratio of long wavelengths to short wavelengths. This takes note of the fact that Ra is an average value, and for a given Ra, differences in the waviness component can greatly affect characteristics.

However, in magnetic recording media having a backcoat layer, simply controlling the surface properties of the magnetic layer results in the transfer of protrusions present on the backcoat layer to the surface of the magnetic layer, forming microindentations and generating so-called "reverse transfer" when the magnetic recording medium is stored in roll form during the manufacturing process and when the magnetic tape is stored wound on a reel hub after preparing as a finished product. This reverse transfer is problematic in that it compromises electromagnetic characteristics, particularly the BB-SNR and K-SNR (proximate noise). Since reverse transfer becomes pronounced following storage for extended periods and storage at elevated temperatures, magnetic recording media having backcoat layers present a problem in the form of roughness due to reverse transfer following storage, even when the initial surface properties of the magnetic layer have been controlled.

DISCLOSURE OF THE INVENTION

Accordingly, it is an object of the present invention to provide a magnetic recording medium having excellent electromagnetic characteristics that do not change following long-term storage or storage at elevated temperatures.

The present inventors, upon conducting extensive research into achieving the above-stated object, discovered that, in addition to controlling the waviness component of the magnetic layer surface, by controlling the waviness component of the backcoat layer surface, particularly waviness with a pitch of 10 micrometers, the reverse transfer of the magnetic layer could be suppressed during long-term storage or high-temperature storage. The reason for this is not entirely clear. However, it is presumed that when reverse transfer occurs, the shape of the back surface is not transferred to the magnetic layer in its entirety. The manner of transfer varies with the pitch and strength (frequency and amplitude) thereof. In particular, controlling the back surface transfer at a 10 micrometer pitch makes it possible to control the transfer of roughness affecting noise in proximity to the output. The present invention was devised on the basis of the above discoveries.

That is, the above-stated object was achieved by the following means:

[1] A magnetic recording medium comprising a magnetic layer comprising a hexagonal ferrite powder and a binder on one surface of a nonmagnetic support and a backcoat layer on the other surface of the nonmagnetic support, wherein a power spectrum density at a pitch of 10 micrometers ranges from 800 to 10,000 $nm^3$ on the magnetic layer surface, a power spectrum density at a pitch of 10 micrometers ranges from 20,000 to 80,000 $nm^3$ on the backcoat layer surface, the magnetic layer has a center surface average surface roughness Ra, as measured by an atomic force microscope, ranging from 0.5 to 2.5 nm, and the hexagonal ferrite powder has an average plate diameter ranging from 10 to 40 nm.

[2] The magnetic recording medium according to [1], which is employed in a magnetic signal reproduction system employing a giant magnetoresistive magnetic head as a reproduction head.

[3] A magnetic signal reproduction system, comprising:
the magnetic recording medium according to [1], and
a reproduction head in the form of a giant magnetoresistive magnetic head.

[4] A magnetic signal reproduction method, reproducing magnetic signals that have been recorded on the magnetic recording medium according to [1] with a giant magnetoresistive magnetic head.

The present invention can provide a high-capacity magnetic recording medium capable of maintaining good electromagnetic characteristics (BB-SNR, K-SNR (proximate noise)) in the high-density region even after long-term storage and high-temperature storage.

BEST MODE FOR CARRYING OUT THE INVENTION

The magnetic recording medium of the present invention is a magnetic recording medium comprising a magnetic layer comprising a hexagonal ferrite powder and a binder on one surface of a nonmagnetic support and a backcoat layer on the other surface of the nonmagnetic support, wherein a power spectrum density at a pitch of 10 micrometers ranges from 800 to 10,000 nm$^3$ on the magnetic layer surface, a power spectrum density at a pitch of 10 micrometers ranges from 20,000 to 80,000 nm$^3$ on the backcoat layer surface, the magnetic layer has a center surface average surface roughness Ra, as measured by an atomic force microscope, ranging from 0.5 to 2.5 nm, and the hexagonal ferrite powder has an average plate diameter ranging from 10 to 40 nm.

The present invention further relates to:
magnetic signal reproduction system, comprising:
the magnetic recording medium of the present invention, and
a reproduction head in the form of a giant magnetoresistive magnetic head;
a magnetic signal reproduction method, reproducing magnetic signals that have been recorded on the magnetic recording medium of the present invention with a giant magnetoresistive magnetic head.

The magnetic recording medium of the present invention will be described in detail below.

The power spectrum density at a pitch of 10 micrometers refers to a value, measured by the following method, that can be employed as an indicator of waviness at a pitch of 10 micrometers. The power spectrum density at a pitch of 10 micrometers will also be referred to as the PSD (10 micrometers) hereinafter.

Surface roughness profile data for a measurement area of 240×180 micrometers in the longitudinal direction of the medium that have been subjected to Fourier transformation processing are averaged to obtain frequency analysis results using a non-contact optical roughness meter (device: HD2000 made by Wyko). The intensity of the individual wavelengths is calculated from the analysis results, and the intensity corresponding to a 10 micrometer pitch is obtained. This is adopted as the PSD (10 micrometers).

The measurement conditions for measuring the center surface average surface roughness Ra of the magnetic layer by an atomic force microscope (AFM) in the present invention are as follows.
Device: Nanoscope III made by Veeco Japan.
Mode: AFM mode (contact mode)
Measurement scope: 40 micrometer square
Scan lines: 512*512
Scan speed: 2 Hz
Scan direction: Longitudinal direction of the medium.

The center surface average surface roughness Ra of the magnetic layer surface is related to the output and S/N ratio. At an Ra exceeding 2.5 nm, the output drops, resulting in deterioration of the S/N ratio. In systems employing high linear recording densities (such as linear recording densities of 100 to 400 kfci) in particular, the deterioration of the S/N ratio due to the drop in output is pronounced. At less than 0.5 nm, the frictional coefficient of the magnetic layer surface increases and running durability deteriorates. Accordingly, in the magnetic recording medium of the present invention, the Ra of the magnetic layer surface is set to within a range of 0.5 to 2.5 nm, desirably a range of 1 to 2 nm.

Further, in addition to controlling the center surface average surface roughness Ra of the magnetic layer surface, the waviness component of the magnetic layer surface are controlled to enhance electromagnetic characteristics in the present invention. In the magnetic recording medium of the present invention, the PSD (10 micrometers) of the magnetic layer surface ranges from 800 to 10,000 nm$^3$. At a magnetic layer surface PSD (10 micrometers) of less than 800 nm$^3$, the magnetic layer surface is excessively smooth, resulting in a rise in the frictional coefficient and deterioration of running durability. When the magnetic layer surface PSD (10 micrometers) of the magnetic layer surface exceeds 10,000 nm$^3$, there is marked deterioration of proximate noise. The magnetic layer surface PSD (10 micrometers) desirably ranges from 800 to 6,000 nm$^3$, and preferably ranges from 800 to 3,000 nm$^3$.

The waviness component of the backcoat layer surface is also controlled in the present invention to prevent deterioration of electromagnetic characteristics due to reverse transfer to the magnetic layer. Investigation by the present inventors resulted in the discovery that when the backcoat layer surface PSD (10 micrometers) exceeded 80,000 nm$^3$, the transfer to the surface of the magnetic layer surface was greatly affected, becoming a cause of deterioration in electromagnetic characteristics. Accordingly, the backcoat layer surface PSD (10 micrometers) is set at equal to or lower than 80,000 nm$^3$ in the magnetic recording medium of the present invention. However, when the backcoat layer PSD (10 micrometers) was less than 20,000 nm$^3$, the winding appearance of the cartridge following drive running deteriorated, and running durability deteriorated due to edge creasing and the like. Accordingly, the backcoat layer surface PSD (10 micrometers) is set to within the range of 20,000 to 80,000 nm$^3$ in the magnetic recording medium of the present invention. This makes it possible to achieve both running durability and electromagnetic characteristics. The backcoat layer surface PSD (10 micrometers) desirably ranges from 20,000 to 60,000 nm$^3$, and preferably ranges from 20,000 to 40,000 nm$^3$.

In the magnetic recording medium of the present invention, the ferromagnetic powder contained in the magnetic layer is hexagonal ferrite powder with an average plate diameter of 10 to 40 nm. To achieve a smooth surface, the ferromagnetic powder is desirably comprised of microparticles of good dispersibility. Since hexagonal ferrite has a lower as than conventional acicular metal ferromagnetic powder, it has good dispersibility. Due to the plate shape, the maximum length of the particle can be small, which is advantageous to achieving microparticles. At an average plate diameter of less than 10 nm, influence due to thermal fluctuation becomes great, a desired coercivity (Hc) cannot be ensured, and electromagnetic characteristics deteriorate. At an average plate diameter exceeding 40 nm, it becomes difficult to ensure high output and low noise at high linear recording densities. The average plate diameter of the hexagonal ferrite powder is desirably 10 to 30 nm, preferably ranging from 15 to 25 nm.

Examples of methods of controlling the Ra and PSD (10 micrometers) of the magnetic layer surface and the backcoat layer surface PSD (10 micrometers) are given below.

(a) Using a support in which the Ra and PSD (10 micrometers) have been controlled.

(b) Providing a smoothing layer of radiation-curable resin or the like on one or both sides of the support to control the PSD (10 micrometers).

In (a) and (b) above, the PSD (10 micrometers) of the support on the magnetic layer side and backcoat layer side is desirably equal to or lower than 6,000 $nm^3$, preferably equal to or lower than 4,000 $nm^3$, and more preferably, equal to or lower than 2,000 $nm^3$. The lower limit is, for example, 100 $nm^3$.

(c) Employing a microgranular powder with good dispersion properties in the coating liquid (also called the "back liquid") used to form the back layer. For example, the backcoat layer coating liquid can be of the same composition as the nonmagnetic layer coating liquid.

(d) Setting the conditions in the smoothing process step (smoothing, calendering).

(e) Subjecting the nonmagnetic layer coating liquid and backcoat layer coating liquid to a grading process (coarse particle centrifugal sedimentation, filtering).

In the smoothing, a shear is applied in the coating direction while the coating layer is still wet immediately after coating the nonmagnetic layer to effectively break up aggregate in the coating layer. Normally, a smooth, hard, platelike smoother (with a center surface average surface roughness Ra of $\leqq 2.5$ nm) is brought into contact with the wet surface to apply the shear.

In calendering, the calendering roll temperature, pressure, speed, material, surface properties, roll structure, and the like are suitably set. The details are as set forth below.

Method (e) above will be described below.

Waviness is thought to be greatly affected by (i) inadequate dispersion of the coating liquid and (ii) drying aggregation following coating. Thus, to prevent waviness, it is desirable to enhance the dispersion conditions and prevent (i). As for (ii), coarse aggregate contained in the coating liquid is thought to serve as nuclei for aggregation during drying. It is presumed that due to the large mass of coarse aggregate, surrounding lightweight particles are attracted. Thus, grading the coating liquid following dispersion is an effective way to remove coarse aggregate and control aggregation during drying. The grading can be conducted by centrifugal separation. Specifically, the coating liquid is desirably kneaded in an open kneader, dispersed in a sand mill using zirconia beads, and graded.

To enhance the surface smoothness, in both the nonmagnetic layer coating liquid and backcoat layer coating liquid, the blending ratio of nonmagnetic powder or inorganic powder to carbon black, as a volumetric ratio, is desirably the former: the latter=8:2 to 5:5. The weight ratio is desirably the former: the latter=9.1 to 7:3. However, since the specific gravity of nonmagnetic powder, inorganic powder, and carbon black differ greatly, it is sometimes impossible to adequately remove the coarse aggregate from the coating liquid in a single grading step. In such cases, following dispersion processing, it is desirable for the coating liquid to be graded by filtering (being passed through a filter) to remove the coarse aggregate of carbon black of relatively low specific gravity, and then subjected to centrifugal sedimentation to remove the coarse aggregate of the nonmagnetic powder and inorganic powder of relative high specific gravity, in a two-step grading process. Centrifugal sedimentation is a process in which the coating liquid is allowed to stand for a prescribed period following centrifugal separation to allow the coarse particles to settle out.

The magnetic recording medium of the present invention will be described in greater detail below.

Nonmagnetic Support

A known film in the form of a polyester such as polyethylene terephthalate or polyethylene naphthalate, polyolefins, cellulose triacetate, polycarbonate, polyamide, polyimide, polyamidoimide, polysulfone, polyaramide, aromatic polyamide, or polybenzooxazole can be employed as the nonmagnetic support. The use of a high-strength support such as polyethylene naphthalate or polyamide is desirable. As needed, laminated supports such as those disclosed in Japanese Unexamined Patent Publication (KOKAI) Heisei No. 3-224127 can be employed to vary the surface roughness of the magnetic surface and the nonmagnetic support surface. The content of the above publication is expressly incorporated herein by reference in its entirety. These supports can be corona discharge treated, plasma treated, treated to facilitate adhesion, heat treated, treated to remove dust, or the like in advance. An aluminum or glass substrate can also be employed as the support.

Of these, a polyester support (referred to simply as "polyester" hereinafter) is desirable. The polyester is desirably comprised of dicarboxylic acid and a diol, such as polyethylene terephthalate and polyethylene naphthalate.

Examples of the dicarboxylic acid component serving as the main structural component are: terephthalic acid, isophthalic acid, phthalic acid, 2,6-naphthalene dicarboxylic acid, 2,7-naphthalene dicarboxylic acid, diphenylsulfone dicarboxylic acid, diphenylether dicarboxylic acid, diphenylethane dicarboxylic acid, cyclohexane dicarboxylic acid, diphenyl dicarboxylic acid, diphenylthioether dicarboxylic acid, diphenylketone dicarboxylic acid, and phenylindane dicarboxylic acid.

Examples of the diol component are: ethylene glycol, propylene glycol, tetramethylene glycol, cyclohexane dimethanol, 2,2-bis(4-hydroxyphenyl)propane, 2,2-bis(4-hydroxyethoxyphenyl)propane, bis(4-hydroxyphenyl)sulfone, bisphenolfluorene dihydroxyethyl ether, diethylene glycol, neopentyl glycol, hydroquinone, and cyclohexanediol.

Among polyesters employing these compounds as main structural components, those comprising main structural components in the form of a dicarboxylic acid component in the form of terephthalic acid and/or 2,6-naphthalene dicarboxylic acid, and a diol component in the form of ethylene glycol and/or 1,4-cyclohexane dimethanol, are desirable from the perspectives of transparency, mechanical strength, dimensional stability, and the like.

Among these, polyesters comprising main structural components in the form of polyethylene terephthalate or polyethylene-2,6-naphthalate; copolymer polyesters comprised of terephthalic acid, 2,6-naphthalene dicarboxylic acid, and ethylene glycol; and polyesters comprising main structural components in the form of mixtures of two or more of these polyesters are preferred. Polyesters comprising polyethylene-2,6-naphthalate as the main structural component are of even greater preference.

The polyester may be biaxially oriented, and may be a laminate with two or more layers.

Other copolymer components may be copolymerized and other polyesters may be mixed into the polyester. Examples are the dicarboxylic acid components and diol components given above by way of example, and polyesters comprised of them.

To help prevent delamination when used in films, aromatic dicarboxylic acids having sulfonate groups or ester-forming derivatives thereof, dicarboxylic acids having polyoxyalkylene groups or ester-forming derivatives thereof, diols having polyoxyalkylene groups, or the like can be copolymerized in the polyester.

Among these, 5-sodiumsulfoisophthalic acid, 2-sodiumsulfoterephthalic acid, 4-sodiumsulfophthalic acid, 4-sodiumsulfo-2,6-naphthylene dicarboxylic acid, compounds in which the sodium in these compounds has been replaced with another metal (such as potassium or lithium), ammonium salt, phosphonium salt, or the like, ester-forming compounds thereof, polyethylene glycol, polytetramethylene glycol, polyethylene glycol-polypropylene glycol copolymers, compounds in which the two terminal hydroxy groups of these compounds have been oxidized or the like to form carboxyl groups, and the like are desirable from the perspectives of the polyester polymerization reaction and film transparency. The ratio of copolymerization to achieve this end is desirably 0.1 to 10 mol percent based on the dicarboxylic acid constituting the polyester.

Further, to increase heat resistance, a bisphenol compound or a compound having a naphthalene ring or cyclohexane ring can be copolymerized. The copolymerization ratio of these compounds is desirably 1 to 20 mol percent based on the dicarboxylic acid constituting the polyester.

The above polyesters can be manufactured according to conventional known polyester manufacturing methods. An example is the direct esterification method, in which the dicarboxylic acid component is directly esterification reacted with the diol component. It is also possible to employ a transesterification method in which a dialkyl ester is first employed as a dicarboxylic acid component to conduct a transesterification reaction with a diol component, and the product is then heated under reduced pressure to remove the excess diol component and conduct polymerization. In this process, transesterification catalysts and polymerization catalysts may be employed and heat-resistant stabilizers added as needed.

One or more of various additives such as anticoloring agents, oxidation inhibitors, crystal nucleus agents, slipping agents, stabilizers, antiblocking agents, UV absorbents, viscosity-regulating agents, defoaming transparency-promoting agents, antistatic agents, pH-regulating agents, dyes, pigments, and reaction-stopping agents can be added at any step during synthesis.

Filler can be added to the polyester. Examples of fillers are: inorganic powders such as spherical silica, colloidal silica, titanium oxide, and alumina, and organic fillers such as crosslinked polystyrene and silicone resin.

Further, to render the supports highly rigid, these materials can be highly oriented, and surface layers of metals, semimetals, and oxides thereof can be provided.

In the present invention, the nonmagnetic support is desirably 3 to 80 micrometers, preferably 3 to 50 micrometers, and more preferably, 3 to 10 micrometers in thickness.

When a smoothing surface (intermediate layer the purpose of which is to smooth) is not provided on the surface of the nonmagnetic support on which the magnetic layer is formed, the center surface average surface roughness (Ra) thereof is desirably equal to or less than 4 nm, preferably equal to or less than 2 nm, and more preferably, equal to or less than 1 nm. The lower limit is, for example, 0.3 nm.

When a smoothing layer (intermediate layer the purpose of which is to smooth) is not provided on the surface on which the backcoat layer is formed, the center surface average surface roughness (Ra) thereof is desirably equal to or less than 6 nm, preferably equal to or less than 3 nm, and more preferably, equal to or less than 1.5 nm. The above Ra regarding the nonmagnetic support is a value measured with an HD2000 made by WYKO.

When a smoothing layer (intermediate layer the purpose of which is to smooth) is not provided on the surface of the surface of the nonmagnetic support on which the magnetic layer is formed, the PSD (10 micrometers) thereof is desirably equal to or less than 15,000 $nm^3$, preferably equal to or less than 10,000 $nm^3$, and more preferably, equal to or less than 5,000 $nm^3$. The lower limit is, for example, 100 $nm^3$. When a smoothing layer (intermediate layer the purpose of which is to smooth) is not provided on the surface on which the backcoat layer is formed, the PSD (10 micrometers) thereof is desirably equal to or less than 50,000 $nm^3$, preferably equal to or less than 20,000 $nm^3$, and more preferably, equal to or less than 10,000 $nm^3$. The lower limit is, for example, 500 $nm^3$. When a smoothing layer is provided, the above surface roughness and PSD (10 micrometers) are desirably satisfied on the surface on which the smoothing layer is provided.

The Young's modulus in both the longitudinal and width directions of the nonmagnetic support is desirably equal to or greater than 6.0 GPa, preferably equal to or greater than 7.0 GPa.

The magnetic recording medium of the present invention comprises a magnetic layer comprising a ferromagnetic powder and a binder on at least one surface of the above nonmagnetic support, and preferably comprises a nonmagnetic layer (also referred to as the lower layer and nonmagnetic lower layer) that is essentially nonmagnetic between the nonmagnetic support and the magnetic layer.

Magnetic Layer

In the magnetic recording medium of the present invention, the ferromagnetic powder contained in the magnetic layer comprises a hexagonal ferrite powder with an average plate diameter of 10 to 40 nm. The volume is desirably 1,000 to 20,000 $nm^3$, preferably 2,000 to 8,000 $nm^3$. By setting the above range, it is possible to effectively suppress a drop in magnetic characteristics due to thermal fluctuation and achieve a good C/N (S/N) ratio while maintaining low noise. The hexagonal ferrite powder is necessarily employed as the ferromagnetic powder, but ferromagnetic metal powder and iron nitride powder can be employed in combination therewith, either in the same layer or in a separate layer.

The volume of the acicular powder can be calculated from the major axis length and minor axis length when envisioning a round columnar shape.

The volume of a plate-shaped powder can be calculated from the plate diameter and axial length (plate thickness) when a square columnar shape (hexagonal columnar shape in the case of hexagonal ferrite powder) is envisioned.

The volume of iron oxide powder can be calculated by envisioning a spherical shape.

The size of the magnetic material can be calculated by the following method.

First, a suitable quantity of the magnetic layer is peeled off. To 30 to 70 mg of the magnetic layer that has been peeled off is added n-butylamine, the mixture is sealed in a glass tube, and the glass tube is placed in a thermal decomposition device. The glass tube is then heated for about a day at 140° C. After cooling, the contents are recovered from the glass tube and centrifugally separated to separate the liquid from the solid component. The solid component that has been separated is cleaned with acetone to obtain a powder sample for TEM. The particles in this sample are photographed at a magnification of 100,000-fold with a model H-9000 transmission electron microscope made by Hitachi and printed on photographic paper at a total magnification of 500,000-fold to obtain particle photographs. The targeted magnetic material is selected from the particle photographs, the contours of the powder material are traced with a digitizer, and the size of the particles is measured with KS-400 image analyzer software from Carl Zeiss. The size of 500 particles is measured.

The size of a powder such as the magnetic material (referred to as the "powder size" hereinafter) in the present invention is denoted: (1) by the length of the major axis constituting the powder, that is, the major axis length, when the powder is acicular, spindle-shaped, or columnar in shape (and the height is greater than the maximum major diameter of the bottom surface); (2) by the maximum major diameter of the tabular surface or bottom surface when the powder is tabular or columnar in shape (and the thickness or height is smaller than the maximum major diameter of the tabular surface or bottom surface); and (3) by the diameter of an equivalent circle when the powder is spherical, polyhedral, or of unspecified shape and the major axis constituting the powder cannot be specified based on shape. The "diameter of an equivalent circle" refers to that obtained by the circular projection method.

The average powder size of the powder is the arithmetic average of the above powder size and is calculated by measuring five hundred primary particles in the above-described method. The term "primary particle" refers to a nonaggregated, independent particle.

The average acicular ratio of the powder refers to the arithmetic average of the value of the (major axis length/minor axis length) of each powder, obtained by measuring the length of the minor axis of the powder in the above measurement, that is, the minor axis length. The term "minor axis length" means the length of the minor axis constituting a powder for a powder size of definition (1) above, and refers to the thickness or height for definition (2) above. For (3) above, the (major axis length/minor axis length) can be deemed for the sake of convenience to be 1, since there is no difference between the major and minor axes.

When the shape of the powder is specified, for example, as in powder size definition (1) above, the average powder size refers to the average major axis length. For definition (2) above, the average powder size refers to the average plate diameter, with the arithmetic average of (maximum major diameter/thickness or height) being referred to as the average plate ratio. For definition (3), the average powder size refers to the average diameter (also called the average particle diameter). In the measurement of powder size, the standard deviation/average value, expressed as a percentage, is defined as the coefficient of variation.

Hexagonal Ferrite Powder

Examples of hexagonal ferrite powders are barium ferrite, strontium ferrite, lead ferrite, calcium ferrite, and various substitution products thereof such as Co substitution products. Specific examples are magnetoplumbite-type barium ferrite and strontium ferrite; magnetoplumbite-type ferrite in which the particle surfaces are covered with spinels; and magnetoplumbite-type barium ferrite, strontium ferrite, and the like partly comprising a spinel phase. The following may be incorporated into the hexagonal ferrite powder in addition to the prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Zn, Co—Ti, Co—Ti—Zr, Co—Ti—Zn, Ni—Ti—Zn, Nb—Zn—Co, Sb—Zn—Co, and Nb—Zn have been added may generally also be employed. They may comprise specific impurities depending on the starting materials and manufacturing methods employed.

The average plate diameter of the hexagonal ferrite powder is, as set forth above, 10 to 40 nm, desirably 10 to 30 nm, and preferably 15 to 25 nm.

An average plate ratio [arithmetic average of (plate diameter/plate thickness)] preferably ranges from 1 to 15, more preferably 1 to 7. When the average plate diameter ranges from 1 to 15, adequate orientation can be achieved while maintaining high filling property in the magnetic layer, as well as increased noise due to stacking between particles can be suppressed. The specific surface area by BET method ($S_{BET}$) within the above particle size range is preferably equal to or higher than 40 m$^2$/g, more preferably 40 to 200 m$^2$/g, and particularly preferably, 60 to 100 m$^2$/g.

Narrow distributions of particle plate diameter and plate thickness of the hexagonal ferrite powder are normally good. 500 particles can be randomly measured in a transmission electron microscope (TEM) photograph of particles to measure the particle plate diameter and plate thickness. The distributions of particle plate diameter and plate thickness are often not a normal distribution. However, when expressed as the standard deviation to the average size, σ/average size is normally 0.1 to 1.0. The particle producing reaction system is rendered as uniform as possible and the particles produced are subjected to a distribution-enhancing treatment to achieve a narrow particle size distribution. For example, methods such as selectively dissolving ultrafine particles in an acid solution by dissolution are known.

A coercivity (Hc) of the hexagonal ferrite powder of about 143.3 to 318.5 kA/m (1800 to 4,000 Oe) can normally be achieved. The coercivity (Hc) of the hexagonal ferrite powder preferably ranges from 159.2 to 238.9 kA/m (2,000 to 3,000 Oe), more preferably 191.0 to 214.9 kA/m (2,200 to 2,800 Oe). The coercivity (Hc) can be controlled by particle size (plate diameter and plate thickness), the types and quantities of elements contained, substitution sites of the element, the particle producing reaction conditions, and the like.

The saturation magnetization ($\sigma_s$) of the hexagonal ferrite powder preferably ranges from 30 to 80 A·m$^2$/kg (30 to 80 emu/g). The higher saturation magnetization ($\sigma_s$) is preferred, however, it tends to decrease with decreasing particle size. Known methods of improving saturation magnetization ($\sigma_s$) are combining spinel ferrite with magnetoplumbite ferrite, selection of the type and quantity of elements incorporated, and the like. It is also possible to employ W-type hexagonal ferrite. When dispersing the magnetic material, the particle surface of the magnetic material can be processed with a substance suited to a dispersion medium and a polymer. Both organic and inorganic compounds can be employed as surface treatment agents. Examples of the principal compounds are oxides and hydroxides of Si, Al, P, and the like; various silane coupling agents; and various titanium coupling agents. The quantity of surface treatment agent added range from, for example, 0.1 to 10 mass percent relative to the mass of the magnetic material. The pH of the magnetic material is also important to dispersion. A pH of about 4 to 12 is usually optimum for the dispersion medium and polymer. From the perspective of the chemical stability and storage properties of the medium, a pH of about 6 to 11 can be selected. Moisture contained in the magnetic material also affects dispersion. There is an optimum level for the dispersion medium and polymer, usually selected from the range of 0.01 to 2.0 percent.

Methods of manufacturing the hexagonal ferrite powder include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to equal to or greater than 100° C.; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. Any manufacturing method can be selected in the present invention. As needed, the hexagonal ferrite powder can be surface treated with Al, Si, P, or an oxide thereof. The quantity is set to, for example, 0.1 to 10 mass percent of the ferromagnetic powder. When applying a surface treatment, the quantity of a lubricant such as a fatty acid that is adsorbed is desirably not greater than 100 mg/m$^2$. The ferromagnetic powder will sometimes contain inorganic ions such as soluble Na, Ca, Fe, Ni, or Sr. These are desirably substantially not present, but seldom affect characteristics at equal to or less than 200 ppm.

Binder

Known techniques regarding binders, lubricants, dispersion agents, additives, solvents, dispersion methods and the like for magnetic layer, nonmagnetic layer and backcoat layer can be suitably applied. In particular, known techniques regarding the quantity and types of binders, and quantity added and types of additives and dispersion agents can be applied.

Conventionally known thermoplastic resins, thermosetting resins, reactive resins, and mixtures of the same can be employed as the binder. A thermoplastic resin having a glass transition temperature of −100 to 150° C., a number average molecular weight of 1,000 to 200,000, desirably 10,000 to 100,000, and a degree of polymerization of about 50 to 1,000 can be employed.

Examples thereof are polymers and copolymers comprising structural units in the form of vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, and vinyl ether; polyurethane resins; and various rubber resins. Further, examples of thermosetting resins and reactive resins are phenol resins, epoxy resins, polyurethane cured resins, urea resins, melamine resins, alkyd resins, acrylic reactive resins, formaldehyde resins, silicone resins, epoxy polyamide resins, mixtures of polyester resins and isocyanate prepolymers, mixtures of polyester polyols and polyisocyanates, and mixtures of polyurethane and polyisocyanates. These resins are described in detail in *Handbook of Plastics* published by Asakura Shoten. It is also possible to employ known electron beam-cured resins in each layer. Examples and manufacturing methods of such resins are described in Japanese Unexamined Patent Publication (KOKAI) Showa No. 62-256219. The contents of the above publications are expressly incorporated herein by reference in their entirety. The above-listed resins may be used singly or in combination. Preferred resins are combinations of polyurethane resin and at least one member selected from the group consisting of vinyl chloride resin, vinyl chloride-vinyl acetate copolymers, vinyl chloride-vinyl acetate-vinyl alcohol copolymers, and vinyl chloride-vinyl acetate-maleic anhydride copolymers, as well as combinations of the same with polyisocyanate.

Polyurethane resins may be employed, such as those having a known structure such as a polyester polyurethane, polyether polyurethane, polyether polyester polyurethane, polycarbonate polyurethane, polyester polycarbonate polyurethane, and polycaprolactone polyurethane. A binder obtained by incorporating as needed one or more polar groups selected from among —COOM, —SO$_3$M, —OSO$_3$M, —P=O(OM)$_2$, and —O—P=O(OM)$_2$ (where M denotes a hydrogen atom or an alkali metal base), —OH, —NR$_2$, —N$^+$R$_3$ (where R denotes a hydrocarbon group), epoxy group, —SH, and —CN into any of the above-listed binders by copolymerization or addition reaction to improve dispersion properties and durability is desirably employed. The quantity of such a polar group ranges from, for example, $10^{-1}$ to $10^{-8}$ mol/g, preferably from $10^{-2}$ to $10^{-6}$ mol/g.

Specific examples of the binders are VAGH, VYHH, VMCH, VAGF, VAGD, VROH, VYES, VYNC, VMCC, XYHL, XYSG, PKHH, PKHJ, PKHC, and PKFE from Dow Chemical Company; MPR-TA, MPR-TA5, MPR-TAL, MPR-TSN, MPR-TMF, MPR-TS, MPR-TM, and MPR-TAO from Nisshin Kagaku Kogyo K. K.; 1000W, DX80, DX81, DX82, DX83, and 100FD from Denki Kagaku Kogyo K. K.; MR-104, MR-105, MR110, MR100, MR555, and 400X-110A from Nippon Zeon Co., Ltd.; Nippollan N2301, N2302, and N2304 from Nippon Polyurethane Co., Ltd.; Pandex T-5105, T-R3080, T-5201, Burnock D-400, D-210-80, Crisvon 6109, and 7209 from Dainippon Ink and Chemicals Incorporated; Vylon UR8200, UR8300, UR-8700, RV530, and RV280 from Toyobo Co., Ltd.; Daipheramine 4020, 5020, 5100, 5300, 9020, 9022, and 7020 from Dainichiseika Color & Chemicals Mfg. Co., Ltd.; MX5004 from Mitsubishi Chemical Corporation; Sanprene SP-150 from Sanyo Chemical Industries, Ltd.; and Saran F310 and F210 from Asahi Chemical Industry Co., Ltd.

The quantity of binder employed in the magnetic layer and the nonmagnetic layer ranges from, for example, 5 to 50 mass percent, preferably from 10 to 30 mass percent, relative to the nonmagnetic powder or magnetic powder. When employing vinyl chloride resin, the quantity added is preferably from 5 to 30 mass percent; when employing polyurethane resin, from 2 to 20 mass percent; and when employing polyisocyanate, from 2 to 20 mass percent. They are preferably employed in combination. However, for example, when head corrosion occurs due to the release of trace amounts of chlorine, polyurethane alone or just polyurethane and isocyanate may be employed. When polyurethane is employed, polyurethanes suitable for use are those having a glass transition temperature ranging from −50 to 150° C., preferably from 0 to 100° C.; a elongation at break preferably ranging from 100 to 2,000 percent; a stress at break ranging from 0.05 to 10 kg/mm$^2$ (0.49 to 98 MPa); and a yield point ranging from 0.05 to 10 kg/mm$^2$ (0.49 to 98 MPa).

Examples of polyisocyanates are tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane triisocyanate, and other isocyanates; products of these isocyanates and polyalcohols; polyisocyanates produced by condensation of isocyanates; and the like. These isocyanates are commercially available under the following trade names, for example: Coronate L, Coronate HL, Coronate 2030, Coronate 2031, Millionate MR and Millionate MTL manufactured by Nippon Polyurethane Industry Co. Ltd.; Takenate D-102, Takenate D-110N, Takenate D-200 and Takenate D-202 manufactured by Takeda Chemical Industries Co., Ltd.; and Desmodule L, Desmodule IL, Desmodule N and Desmodule HL manufactured by Sumitomo Bayer Co., Ltd. They can be used in each layer singly or in combinations of two or more by exploiting differences in curing reactivity.

Additives may be added to the magnetic layer as needed. Examples of such additives are: abrasives, lubricants, dispersing agents, dispersing adjuvants, antifungal agents, antistatic agents, oxidation inhibitors, solvents, and carbon black. Examples of additives are: molybdenum disulfide, tungsten disulfide, graphite, boron nitride, graphite fluoride, silicone oil, polar group-comprising silicone, fatty acid-modified silicone, fluorosilicone, fluoroalcohols, fluoroesters, polyolefin, polyglycol, polyphenyl ether, phenyl phosphonic acid, benzyl phosphonic acid, phenethyl phosphonic acid, α-methylbenzylphosphonic acid, 1-methyl-1-phenethylphosphonic acid, diphenylmethylphosphonic acid, biphenylphosphonic acid, benzylphenylphosphonic acid, α-cumylphosphonic acid, toluoylphosphonic acid, xylylphosphonic acid, ethylphenylphosphonic acid, cumenylphosphonic acid, propylphenylphosphonic acid, butylphenylphosphonic acid, heptylphenylphosphonic acid, octylphenylphosphonic acid, nonylphenylphosphonic acid, other aromatic ring-comprising organic phosphonic acids, alkali metal salts thereof, octylphosphonic acid, 2-ethylhexylphosphonic acid, isooctylphosphonic acid, isononylphosphonic acid, isodecylphosphonic acid, isoundecylphosphonic acid, isododecylphosphonic acid, isohexadecylphosphonic acid, isooctadecylphosphonic acid, isoeicosylphosphonic acid, other alkyl phosphonoic acid, alkali metal salts thereof, phenyl phosphoric acid, benzyl phosphoric acid, phenethyl phosphoric acid, α-methylbenzylphosphoric acid, 1-methyl-1-phenethylphosphoric acid, diphenylmethylphosphoric acid, diphenyl phosphoric acid, benzylphenyl phosphoric acid, α-cumyl phosphoric acid, toluoyl phosphoric acid, xylyl phosphoric acid, ethylphenyl phosphoric acid, cumenyl phosphoric acid, propylphenyl phosphoric acid, butylphenyl phosphoric acid, heptylphenyl phosphoric acid, octylphenyl phosphoric acid, nonylphenyl phosphoric acid, other aromatic phosphoric esters, alkali metal salts thereof, octyl phosphoric acid, 2-ethylhexylphosphoric acid, isooctyl phosphoric acid, isononyl phosphoric acid, isodecyl phosphoric acid, isoundecyl phosphoric acid, isododecyl phosphoric acid, isohexadecyl phosphoric acid, isooctyldecyl phosphoric acid, isoeicosyl phosphoric acid, other alkyl ester phosphoric acids, alkali metal salts thereof, alkylsulfonic acid ester, alkali metal salts thereof, fluorine-containing alkyl sulfuric acid esters, alkali metal salts thereof, lauric acid, myristic acid, palmitic acid, stearic acid, behenic acid, butyl stearate, oleic acid, linolic acid, linoleic acid, elaidic acid, erucic acid, other monobasic fatty acids comprising 10 to 24 carbon atoms (which may contain an unsaturated bond or be branched), metal salts thereof, butyl stearate, octyl stearate, amyl stearate, isooctyl stearate, octyl myristate, butyl laurate, butoxyethyl stearate, anhydrosorbitan monostearate, anhydrosorbitan tristearate, other monofatty esters, difatty esters, or polyfatty esters comprising a monobasic fatty acid having 10 to 24 carbon atoms (which may contain an unsaturated bond or be branched) and any one from among a monohydric, dihydric, trihydric, tetrahydric, pentahydric or hexahydric alcohol having 2 to 22 carbon atoms (which may contain an unsaturated bond or be branched), alkoxyalcohol having 12 to 22 carbon atoms (which may contain an unsaturated bond or be branched) or a monoalkyl ether of an alkylene oxide polymer, fatty acid amides with 2 to 22 carbon atoms, and aliphatic amines with 8 to 22 carbon atoms. Compounds having aralkyl groups, aryl groups, or alkyl groups substituted with groups other than hydrocarbon groups, such as nitro groups, F, Cl, Br, $CF_3$, $CCl_3$, $CBr_3$, and other halogen-containing hydrocarbons in addition to the above hydrocarbon groups, may also be employed.

It is also possible to employ nonionic surfactants such as alkylene oxide-based surfactants, glycerin-based surfactants, glycidol-based surfactants and alkylphenolethylene oxide adducts; cationic surfactants such as cyclic amines, ester amides, quaternary ammonium salts, hydantoin derivatives, heterocycles, phosphoniums, and sulfoniums; anionic surfactants comprising acid groups, such as carboxylic acid, sulfonic acid, phosphoric acid, sulfuric ester groups, and phosphoric ester groups; and ampholytic surfactants such as amino acids, amino sulfonic acids, sulfuric or phosphoric esters of amino alcohols, and alkyl betaines. Details of these surfactants are described in *A Guide to Surfactants* (published by Sangyo Tosho K.K.).

The above-described lubricants, antistatic agents and the like need not be 100 percent pure and may contain impurities, such as isomers, unreacted material, by-products, decomposition products, and oxides in addition to the main components. These impurities are preferably comprised equal to or less than 30 mass percent, and more preferably equal to or less than 10 mass percent.

Specific examples of these additives are: NAA-102, hydrogenated castor oil fatty acid, NAA-42, Cation SA, Nymeen L-201, Nonion E-208, Anon BF and Anon LG manufactured by NOF Corporation; FAL-205 and FAL-123 manufactured by Takemoto Oil & Fat Co., Ltd.; NJLUB OL manufactured by New Japan Chemical Co. Ltd.; TA-3 manufactured by Shin-Etsu Chemical Co. Ltd.; Armide P manufactured by Lion Corporation; Duomine TDO manufactured by Lion Corporation; BA-41G manufactured by Nisshin OilliO, Ltd.; and Profan 2012E, Newpole PE61 and Ionet MS-400 manufactured by Sanyo Chemical Industries, Ltd.

Carbon black may be added to the magnetic layer as needed. Examples of types of carbon black that are suitable for use in the magnetic layer are: furnace black for rubber, thermal for rubber, black for coloring, and acetylene black. It is preferable that the specific surface area is 5 to 500 $m^2/g$, the DBP oil absorption capacity is 10 to 400 ml/100 g, the particle diameter is 5 to 300 nm, the pH is 2 to 10, the moisture content is 0.1 to 10 percent, and the tap density is 0.1 to 1 g/ml.

Specific examples of carbon black are: BLACK PEARLS 2000, 1300, 1000, 900, 905, 800, 700 and VULCAN XC-72 from Cabot Corporation; #80, #60, #55, #50 and #35 manufactured by Asahi Carbon Co., Ltd.; #2400B, #2300, #900, #1000, #30, #40 and #10B from Mitsubishi Chemical Corporation; CONDUCTEX SC, RAVEN 150, 50, 40, 15 and RAVEN MT-P from Columbia Carbon Co., Ltd.; and Ketjen Black EC from Ketjen Black International Co., Ltd. The carbon black employed may be surface-treated with a dispersant or grafted with resin, or have a partially graphite-treated surface. The carbon black may be dispersed in advance into the binder prior to addition to the magnetic coating liquid. These carbon blacks may be used singly or in combination. When employing carbon black, the quantity preferably ranges from 0.1 to 30 mass percent with respect to the mass of the magnetic material. In the magnetic layer, carbon black can work to prevent static, reduce the coefficient of friction, impart light-blocking properties, enhance film strength, and the like; the properties vary with the type of carbon black employed. Accordingly, the type, quantity, and combination of carbon blacks employed in the present invention may be determined separately for the magnetic layer and the nonmagnetic layer based on the objective and the various characteristics stated above, such as particle size, oil absorption capacity, electrical conductivity, and pH, and be optimized for each layer. For example, the *Carbon Black Handbook* compiled by the Carbon Black Association may be consulted for types of carbon black suitable for use in the magnetic layer of the present invention.

Abrasive

Known materials chiefly having a Mohs' hardness of equal to or greater than 6 may be employed either singly or in combination as abrasives. These include: α-alumina with an α-conversion rate of equal to or greater than 90 percent, β-alumina, silicon carbide, chromium oxide, cerium oxide, α-iron oxide, corundum, synthetic diamond, silicon nitride, silicon carbide titanium carbide, titanium oxide, silicon dioxide, and boron nitride. Complexes of these abrasives (obtained by surface treating one abrasive with another) may also be employed. There are cases in which compounds or elements other than the primary compound are contained in these abrasives; the effect does not change so long as the content of the primary compound is equal to or greater than 90 percent. The particle size of the abrasive is preferably 0.01 to 2μ. To enhance electromagnetic characteristics, a narrow particle size distribution is desirable. Abrasives of differing particle size may be incorporated as needed to improve durability; the same effect can be achieved with a single abrasive as with a wide particle size distribution. It is preferable that the tap density is 0.3 to 2 g/cc, the moisture content is 0.1 to 5 percent, the pH is 2 to 11, and the specific surface area is 1 to 30 m$^2$/g. The shape of the abrasive may be acicular, spherical, cubic, plate-shaped or the like. However, a shape comprising an angular portion is desirable due to high abrasiveness. Specific examples are AKP-12, AKP-15, AKP-20, AKP-30, AKP-50, HIT-20, HIT-30, HIT-55, HIT-60, HIT-70, HIT-80, and HIT-100 made by Sumitomo Chemical Co., Ltd.; ERC-DBM, HP-DBM, and HPS-DBM made by Reynolds Corp.; WA10000 made by Fujimi Abrasive Corp.; UB20 made by Uemura Kogyo Corp.; G-5, Chromex U2, and Chromex U1 made by Nippon Chemical Industrial Co., Ltd.; TF100 and TF140 made by Toda Kogyo Corp.; Beta Random Ultrafine made by Ibiden Co., Ltd.; and B-3 made by Showa Kogyo Co., Ltd. These abrasives may be added as needed to the nonmagnetic layer. Addition of abrasives to the nonmagnetic layer can be done to control surface shape, control how the abrasive protrudes, and the like. The particle diameter and quantity of the abrasives added to the magnetic layer and nonmagnetic layer should be set to optimal values.

Known organic solvents can be used. Examples of the organic solvents are ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ether, glycol monoethyl ether, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; N,N-dimethylformamide; and hexane; these may be employed in any ratio.

These organic solvents need not be 100 percent pure and may contain impurities such as isomers, unreacted materials, by-products, decomposition products, oxides and moisture in addition to the main components. The content of these impurities is preferably equal to or less than 30 mass percent, more preferably equal to or less than 10 mass percent. Preferably the same type of organic solvent is employed in the magnetic layer and in the nonmagnetic layer. However, the amount added may be varied. The stability of coating is increased by using a solvent with a high surface tension (such as cyclohexanone or dioxane) in the nonmagnetic layer. Specifically, it is important that the arithmetic mean value of the upper layer solvent composition be not less than the arithmetic mean value of the nonmagnetic layer solvent composition. To improve dispersion properties, a solvent having a somewhat strong polarity is desirable. It is desirable that solvents having a dielectric constant equal to or higher than 15 are comprised equal to or higher than 50 mass percent of the solvent composition. Further, the dissolution parameter is desirably 8 to 11.

The types and quantities of dispersing agents, lubricants, and surfactants employed in the magnetic layer may differ from those employed in the nonmagnetic layer, described further below, in the present invention. For example (the present invention not being limited to the embodiments given herein), a dispersing agent usually has the property of adsorbing or bonding by means of a polar group. In the magnetic layer, the dispersing agent adsorbs or bonds by means of the polar group primarily to the surface of the ferromagnetic metal powder, and in the nonmagnetic layer, primarily to the surface of the nonmagnetic powder. It is surmised that once an organic phosphorus compound has adsorbed or bonded, it tends not to dislodge readily from the surface of a metal, metal compound, or the like. Accordingly, the surface of a ferromagnetic metal powder or the surface of a nonmagnetic powder of the present invention becomes covered with the alkyl group, aromatic groups, and the like. This enhances the compatibility of the ferromagnetic metal powder or nonmagnetic powder with the binder resin component, further improving the dispersion stability of the ferromagnetic metal powder or nonmagnetic powder. Further, lubricants are present in a free state. Thus, it is conceivable to use fatty acids with different melting points in the nonmagnetic layer and magnetic layer to control seepage onto the surface, employ esters with different boiling points and polarity to control seepage onto the surface, regulate the quantity of the surfactant to enhance coating stability, and employ a large quantity of lubricant in the nonmagnetic layer to enhance the lubricating effect. All or some part of the additives employed in the present invention can be added in any of the steps during the manufacturing of coating liquids for the magnetic layer and nonmagnetic layer. For example, there are cases where they are mixed with the ferromagnetic powder prior to the kneading step; cases where they are added during the step in which the ferromagnetic powder, binder, and solvent are kneaded; cases where they are added during the dispersion step; cases where they are added after dispersion; and cases where they are added directly before coating.

Nonmagnetic Layer

Details of the nonmagnetic layer will be described below. The magnetic recording medium of the present invention can comprise a nonmagnetic layer comprising a nonmagnetic powder and a binder on the nonmagnetic support. Both organic and inorganic substances may be employed as the nonmagnetic powder in the nonmagnetic layer. Carbon black may also be employed. Examples of inorganic substances are metals, metal oxides, metal carbonates, metal sulfates, metal nitrides, metal carbides, and metal sulfides.

Specifically, titanium oxides such as titanium dioxide, cerium oxide, tin oxide, tungsten oxide, ZnO, $ZrO_2$, $SiO_2$, $Cr_2O_3$, α-alumina with an α-conversion rate of 90 to 100 percent, β-alumina, γ-alumina, α-iron oxide, goethite, corundum, silicon nitride, titanium carbide, magnesium oxide, boron nitride, molybdenum disulfide, copper oxide, $MgCO_3$, $CaCO_3$, $BaCO_3$, $SrCO_3$, $BaSO_4$, silicon carbide, and titanium carbide may be employed singly or in combinations of two or more. α-iron oxide and titanium oxide are preferred.

The nonmagnetic powder may be acicular, spherical, polyhedral, or plate-shaped. The crystallite size of the nonmagnetic powder preferably ranges from 4 nm to 500 nm, more preferably from 40 to 100 nm. A crystallite size falling within a range of 4 nm to 500 nm is desirable in that it facilitates dispersion and imparts a suitable surface roughness. The average particle diameter of the nonmagnetic powder preferably ranges from 5 nm to 500 nm. As needed, nonmagnetic powders of differing average particle diameter may be combined; the same effect may be achieved by broadening the average particle distribution of a single nonmagnetic powder. The particularly preferred average particle diameter of the nonmagnetic powder ranges from 10 to 200 nm. Within a range of 5 nm to 500 nm, dispersion is good and a nonmagnetic layer with good surface roughness can be achieved; the above range is preferred.

The specific surface area of the nonmagnetic powder ranges from, for example, 1 to 150 $m^2/g$, preferably from 20 to 120 $m^2/g$, and more preferably from 50 to 100 $m^2/g$. Within the specific surface area ranging from 1 to 150 $m^2/g$, suitable surface roughness can be achieved and dispersion is possible with the desired quantity of binder; the above range is preferred. Oil absorption capacity using dibutyl phthalate (DBP) preferably ranges from 5 to 100 mL/100 g, more preferably from 10 to 80 mL/100 g, and further preferably from 20 to 60 mL/100 g. The specific gravity ranges from, for example, 1 to 12, preferably from 3 to 6. The tap density ranges from, for example, 0.05 to 2 g/mL, preferably from 0.2 to 1.5 g/mL. A tap density falling within a range of 0.05 to 2 g/mL can reduce the amount of scattering particles, thereby facilitating handling, and tends to prevent solidification to the device. The pH of the nonmagnetic powder preferably ranges from 2 to 11, more preferably from 6 to 9. When the pH falls within a range of 2 to 11, the coefficient of friction does not become high at high temperature or high humidity or due to the freeing of fatty acids. The moisture content of the nonmagnetic powder ranges from, for example, 0.1 to 5 mass percent, preferably from 0.2 to 3 mass percent, and more preferably from 0.3 to 1.5 mass percent. A moisture content falling within a range of 0.1 to 5 mass percent is desirable because it can produce good dispersion and yield a stable coating viscosity following dispersion. An ignition loss of equal to or less than 20 mass percent is desirable and nonmagnetic powders with low ignition losses are desirable.

When the nonmagnetic powder is an inorganic powder, the Mohs' hardness is preferably 4 to 10. Durability can be ensured if the Mohs' hardness ranges from 4 to 10. The stearic acid (SA) adsorption capacity of the nonmagnetic powder preferably ranges from 1 to 20 μmol/$m^2$, more preferably from 2 to 15 μmol/$m^2$. The heat of wetting in 25° C. water of the nonmagnetic powder is preferably within a range of 200 to 600 erg/$cm^2$ (200 to 600 mJ/$m^2$). A solvent with a heat of wetting within this range may also be employed. The quantity of water molecules on the surface at 100 to 400° C. suitably ranges from 1 to 10 pieces per 100 Angstroms. The pH of the isoelectric point in water preferably ranges from 3 to 9. The surface of these nonmagnetic powders preferably contains $Al_2O_3$, $SiO_2$, $TiO_2$, $ZrO_2$, $SnO_2$, $Sb_2O_3$, and ZnO by conducting surface treatment. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. They may be employed singly or in combination. Depending on the objective, a surface-treatment coating layer with a coprecipitated material may also be employed, the method which comprises a first alumina coating and a second silica coating thereover or the reverse method thereof may also be adopted. Depending on the objective, the surface-treatment coating layer may be a porous layer, with homogeneity and density being generally desirable.

Specific examples of nonmagnetic powders suitable for use in the nonmagnetic layer are: Nanotite from Showa Denko K. K.; HIT-100 and ZA-G1 from Sumitomo Chemical Co., Ltd.; DPN-250, DPN-250BX, DPN-245, DPN-270BX, DPN-550BX and DPN-550RX from Toda Kogyo Corp.; titanium oxide TTO-51B, TTO-55A, TTO-55B, TTO-55C, TTO-55S, TTO-55D, SN-100, MJ-7, α-iron oxide E270, E271 and E300 from Ishihara Sangyo Co., Ltd.; STT-4D, STT-30D, STT-30 and STT-65C from Titan Kogyo K. K.; MT-100S, MT-100T, MT-150W, MT-500B, T-600B, T-100F and T-500HD from Tayca Corporation; FINEX-25, BF-1, BF-10, BF-20 and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; Y-LOP from Titan Kogyo K. K.; and sintered products of the same. Particular preferable nonmagnetic powders are titanium dioxide and α-iron oxide.

Carbon black may be combined with nonmagnetic powder in the nonmagnetic layer to reduce surface resistivity, reduce light transmittance, and achieve a desired micro-Vickers hardness. The micro-Vickers hardness of the nonmagnetic layer is normally 25 to 60 kg/$mm^2$ (245 to 588 MPa), desirably 30 to 50 kg/$mm^2$ (294 to 490 MPa) to adjust head contact. It can be measured with a thin film hardness meter (HMA-400 made by NEC Corporation) using a diamond triangular needle with a tip radius of 0.1 micrometer and an edge angle of 80 degrees as indenter tip. "Techniques for evaluating thin-film mechanical characteristics," Realize Corp. can be referred to for details. The light transmittance is generally standardized to an infrared absorbance at a wavelength of about 900 nm equal to or less than 3 percent. For example, in VHS magnetic tapes, it has been standardized to equal to or less than 0.8 percent. To this end, furnace black for rubber, thermal black for rubber, black for coloring, acetylene black and the like may be employed.

The specific surface area of the carbon black employed in the nonmagnetic layer is, for example, 100 to 500 $m^2/g$, preferably 150 to 400 $m^2/g$. The DBP oil absorption capability is, for example, 20 to 400 mL/100 g, preferably 30 to 200 mL/100 g. The particle diameter of the carbon black is, for example, 5 to 80 nm, preferably 10 to 50 nm, and more preferably, 10 to 40 nm. It is preferable that the pH of the carbon black is 2 to 10, the moisture content is 0.1 to 10 percent, and the tap density is 0.1 to 1 g/mL.

Specific examples of types of carbon black employed in the nonmagnetic layer are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B and MA-600 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Ketjen Black International Co., Ltd.

The carbon black employed may be surface-treated with a dispersant or grafted with resin, or have a partially graphite-treated surface. The carbon black may be dispersed in advance into the binder prior to addition to the coating liquid. The quantity of the carbon black is preferably within a range not exceeding 50 mass percent of the inorganic powder as well as not exceeding 40 percent of the total mass of the nonmagnetic layer. These carbon blacks may be used singly or in combination. For example, the *Carbon Black Handbook* compiled by the Carbon Black Association may be consulted for types of carbon black suitable for use in the nonmagnetic layer of the present invention.

Based on the objective, an organic powder may be added to the nonmagnetic layer. Examples of such an organic powder are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed. The contents of the above publications are expressly incorporated herein by reference in their entirety.

Binders, lubricants, dispersing agents, additives, solvents, dispersion methods, and the like suited to the magnetic layer may be adopted to the nonmagnetic layer. In particular, known techniques for the quantity and type of binder and the quantity and type of additives and dispersion agents employed in the magnetic layer may be adopted thereto.

An undercoating layer can be provided in the magnetic recording medium of the present invention. Providing an undercoating layer can enhance adhesive strength between the support and the magnetic layer or nonmagnetic layer. For example, a polyester resin that is soluble in solvent can be employed as the undercoating layer to enhance adhesion. As described below, a smoothing layer can be provided as an undercoating layer.

Layer Structure

As for the thickness structure of the magnetic recording medium of the present invention, the thickness of the nonmagnetic support preferably ranges from 3 to 80 micrometers, more preferably from 3 to 50 micrometers, further preferably from 3 to 10 micrometers, as set forth above. When an undercoating layer is provided between the nonmagnetic support and the nonmagnetic layer or the magnetic layer, the thickness of the undercoating layer ranges from, for example, 0.01 to 0.8 micrometer, preferably 0.02 to 0.6 micrometer.

An intermediate layer can be provided between the support and the nonmagnetic layer or the magnetic layer and/or between the support and the backcoat layer to improve smoothness. For example, the intermediate layer can be formed by coating and drying a coating liquid comprising a polymer on the surface of the nonmagnetic support, or by coating a coating liquid comprising a compound (radiation-curable compound) comprising intramolecular radiation-curable functional groups and then irradiating it with radiation to cure the coating liquid.

A radiation-curable compound having a number average molecular weight ranging from 200 to 2,000 is desirably employed. When the molecular weight is within the above range, the relatively low molecular weight can facilitate coating flow during the calendering step, increasing moldability and permitting the formation of a smooth coating.

A radiation-curable compound in the form of a bifunctional acrylate compound with the molecular weight of 200 to 2,000 is desirable. Bisphenol A, bisphenol F, hydrogenated bisphenol A, hydrogenated bisphenol F, and compounds obtained by adding acrylic acid or methacrylic acid to alkylene oxide adducts of these compounds are preferred.

The radiation-curable compound can be used in combination with a polymeric binder. Examples of the binder employed in combination are conventionally known thermoplastic resins, thermosetting resins, reactive resins, and mixtures thereof. When the radiation employed is UV radiation, a polymerization initiator is desirably employed in combination. A known photoradical polymerization initiator, photocationic polymerization initiator, photoamine generator, or the like can be employed as the polymerization initiator.

A radiation-curable compound can also be employed in the nonmagnetic layer.

The thickness of the magnetic layer can be optimized based on the saturation magnetization of the head employed, the length of the head gap, and the recording signal band, and is normally 10 to 150 nm, preferably 20 to 120 nm, more preferably 30 to 100 nm, and further preferably 30 to 80 nm. The thickness variation ($\sigma/\delta$) in the magnetic layer is preferably within ±50 percent, more preferably within ±30 percent. At least one magnetic layer is sufficient. The magnetic layer may be divided into two or more layers having different magnetic characteristics, and a known configuration relating to multi-layered magnetic layer may be applied.

The thickness of the nonmagnetic layer ranges from, for example, 0.1 to 3.0 µm, preferably 0.3 to 2.0 µm, and more preferably 0.5 to 1.5 µm. The nonmagnetic layer is effective so long as it is substantially nonmagnetic in the magnetic recording medium of the present invention. For example, it exhibits the effect of the present invention even when it comprises impurities or trace amounts of magnetic material that have been intentionally incorporated, and can be viewed as substantially having the same configuration as the magnetic recording medium of the present invention. The term "substantially nonmagnetic" is used to mean having a residual magnetic flux density in the nonmagnetic layer of equal to or less than 10 mT, or a coercivity of equal to or less than 7.96 kA/m (100 Oe), it being preferable not to have a residual magnetic flux density or coercivity at all.

Backcoat Layer

The backcoat layer is provided on the opposite surface of the nonmagnetic support from the surface on which the magnetic layer is provided, in the magnetic recording medium of the present invention. The backcoat layer desirably comprises carbon black and inorganic powder. The formula of the magnetic layer or nonmagnetic layer can be applied to the binder and various additives. The above-described formula of the nonmagnetic layer is particularly preferably applied. The backcoat layer is preferably equal to or less than 0.9 micrometer, more preferably 0.1 to 0.7 micrometer, in thickness.

[Manufacturing Method]

The process for manufacturing a magnetic layer coating liquid or a coating liquid for forming a nonmagnetic layer or a backcoat layer comprises at least a kneading step, a dispersing step, and a mixing step to be carried out, if necessary, before and/or after the kneading and dispersing steps. Each of the individual steps may be divided into two or more stages. All of the starting materials employed in the present invention, including the ferromagnetic powder, nonmagnetic powder, binders, carbon black, abrasives, antistatic agents, lubricants, solvents, and the like, may be added at the beginning of, or during, any of the steps. Moreover, the individual starting materials may be divided up and added during two or more steps. For example, polyurethane may be divided up and added in the kneading step, the dispersion step, and the mixing step for viscosity adjustment after dispersion. To achieve the object of the present invention, conventionally known manufacturing techniques may be utilized for some of the steps. A kneader having a strong kneading force, such as an open kneader, continuous kneader, pressure kneader, or extruder is preferably employed in the kneading step. Details of the kneading process are described in Japanese Unexamined Patent Publication (KOKAI) Heisei Nos. 1-106338 and 1-79274. The contents of these publications are incorporated herein by reference in their entirety. Further, glass beads may be employed to disperse the magnetic layer, nonmagnetic layer or back layer coating liquid, with a dispersing medium with a high specific gravity such as zirconia beads, titania beads, and steel beads being suitable for use as the glass beads. The particle diameter and fill ratio of these dispersing media can be optimized for use. A known dispersing device may be employed.

Dispersion is desirably enhanced through the dispersion conditions (type and quantity of bead and peripheral speed employed in dispersion and the dispersion time) in the steps of manufacturing the coating liquid. As set forth above, the coating liquid is desirably graded before coating to effectively suppress reaggregation during drying. Any of the following methods may be employed as the grading process in the present invention: natural sedimentation controlling the particle size distribution based on liquid concentration and time, and centrifugal sedimentation controlling the particle size distribution based on liquid concentration, the rotational speed of the centrifugal separator, or the processing time.

In the method of manufacturing the magnetic recording medium, the magnetic layer is formed by coating a magnetic layer coating liquid to prescribed thickness on the surface of a running nonmagnetic support, for example. Multiple magnetic layer coating liquids may be successively or simultaneously coated in a multilayer coating, or a nonmagnetic layer coating liquid and a magnetic layer coating liquid may be successively or simultaneously coated in a multilayer coating. Generally, the successive multilayer coating method tends to reduce variation in the interface between the upper and lower layers to a greater degree than the simultaneously multilayer coating method. Further, since a high shear tends to be exerted on the coating liquid during thin-film coating of the magnetic layer, the use of the successive multilayer coating method is desirable for controlling waviness. Coating machines suitable for use in coating the magnetic layer or nonmagnetic layer coating liquid are air doctor coaters, blade coaters, rod coaters, extrusion coaters, air knife coaters, squeeze coaters, immersion coaters, reverse roll coaters, transfer roll coaters, gravure coaters, kiss coaters, cast coaters, spray coaters, spin coaters, and the like. For example, "Recent Coating Techniques" (May 31, 1983), issued by the Sogo Gijutsu Center K.K. may be referred to in this regard.

When it is a magnetic tape, the coating layer that is formed by applying the magnetic layer coating liquid can be magnetic field orientation processed using cobalt magnets or solenoids on the ferromagnetic powder contained in the coating layer. When it is a disk, an adequately isotropic orientation can be achieved in some products without orientation using an orientation device, but the use of a known random orientation device in which cobalt magnets are alternately arranged diagonally, or alternating fields are applied by solenoids, is desirable. In the case of ferromagnetic metal powder, the term "isotropic orientation" generally refers to a two-dimensional in-plane random orientation, which is desirable, but can refer to a three-dimensional random orientation achieved by imparting a perpendicular component. Further, a known method, such as opposing magnets of opposite poles, can be employed to effect perpendicular orientation, thereby imparting an isotropic magnetic characteristic in the peripheral direction. Perpendicular orientation is particularly desirable when conducting high-density recording. Spin coating can be used to effect peripheral orientation.

The drying position of the coating is desirably controlled by controlling the temperature and flow rate of drying air, and coating speed. A coating speed of 20 m/min to 1,000 m/min and a dry air temperature of equal to or higher than 60° C. are desirable. Suitable predrying can be conducted prior to entry into the magnet zone.

The coated stock material thus obtained can be normally temporarily wound on a take-up roll, and then unwound from the take-up roll and calendered.

For example, super calender rolls or the like is employed in calendering. Calendering can enhance surface smoothness, eliminate voids produced by the removal of solvent during drying, and increase the fill rate of the ferromagnetic powder in the magnetic layer, thus yielding a magnetic recording medium of good electromagnetic characteristics. The calendering step is desirably conducted by varying the calendering conditions based on the smoothness of the surface of the coated stock material.

The glossiness of the coated stock material may decrease roughly from the center of the take-up roll toward the outside, and there is sometimes variation in the quality in the longitudinal direction. Glossiness is known to correlate (proportionally) to the surface roughness Ra. Accordingly, when the calendering conditions are not varied in the calendering step, such as by maintaining a constant calender roll pressure, there is no countermeasure for the difference in smoothness in the longitudinal direction resulting from winding of the coated stock material, and the variation in quality in the longitudinal direction carries over into the final product.

Accordingly, in the calendering step, it is desirable to vary the calendering conditions, such as the calender roll pressure, to cancel out the different in smoothness in the longitudinal direction that is produced by winding of the coated stock material. Specifically, it is desirable to reduce the calender roll pressure from the center to the outside of the coated stock material that is wound off the take-up roll. Based on an investigation by the present inventors, lowering the calender roll pressure decreases the glossiness (smoothness diminishes). Thus, the difference in smoothness in the longitudinal direction that is produced by winding of the coated stock material is cancelled out, yielding a final product free of variation in quality in the longitudinal direction.

An example of changing the pressure of the calender rolls has been described above. Additionally, it is possible to control the calender roll temperature, calender roll speed, and calender roll tension. Taking into account the properties of a particulate medium, it is desirable to control the surface smoothness by means of the calender roll pressure and calender roll temperature. The calender roll pressure is reduced, or the calender roll temperature is lowered, to diminish the surface smoothness of the final product. Conversely, the calender roll pressure is increased or the calender roll temperature is raised to increase the surface smoothness of the final product.

Alternatively, the magnetic recording medium obtained following the calendering step can be thermally processed to promote thermal curing. Such thermal processing can be suitably determined based on the blending formula of the magnetic layer coating liquid, for example, at 35 to 100° C., desirably at 50 to 80° C. The thermal processing time is, for example, 12 to 72 hours, desirably 24 to 48 hours.

Rolls of a heat-resistant plastic such as epoxy, polyimide, polyamide, or polyamidoimide, can be employed as the calender rolls. Processing with metal rolls is also possible.

The calendering conditions are as follows. The calender roll temperature is, for example, set to within a range of 60 to 100° C., desirably within a range of 70 to 100° C., and preferably within a range of 80 to 100° C. The pressure, for example, ranges from 100 to 500 kg/cm (98 to 490 kN/m), desirably ranges from 200 to 450 kg/cm (196 to 441 kN/m), and preferably, ranges from 300 to 400 kg/cm (294 to 392 kN/m).

As set forth above, the magnetic layer in the magnetic recording medium of the present invention has a center surface average surface roughness Ra of 0.5 to 2.5 nm, preferably 1 to 2 nm, as measured by an atomic force microscope (AFM).

The ten-point average roughness Ra of the magnetic layer is desirably equal to or less than 30 nm. These values can be controlled by controlling the surface properties with the filler in the support, the roll surface shape during calendaring, and the like. The curl is desirably within ±3 mm.

The magnetic recording medium obtained can be cut to desired size with a cutter or the like for use. The cutter is not specifically limited, but desirably comprises multiple sets of a rotating upper blade (male blade) and lower blade (female blade). The slitting speed, engaging depth, peripheral speed ratio of the upper blade (male blade) and lower blade (female blade) (upper blade peripheral speed/lower blade peripheral speed), period of continuous use of slitting blade, and the like are suitably selected.

Physical Properties

The saturation magnetic flux density of the magnet layer in the magnetic recording medium of the present invention is preferably 100 to 400 mT. The coercivity (Hc) of the magnetic layer is preferably 143.2 to 318.3 kA/m (1,800 to 4,000 Oe), more preferably 159.2 to 278.5 kA/m (2,000 to 3,500 Oe). Narrower coercivity distribution is preferable. The SFD and SFDr are preferably equal to or lower than 0.6, more preferably equal to or lower than 0.3.

The coefficient of friction of the magnetic recording medium of the present invention relative to the head is equal to or less than 0.50 and preferably equal to or less than 0.3 at temperatures ranging from −10° C. to 40° C. and humidity ranging from 0 percent to 95 percent, the surface resistivity on the magnetic surface preferably ranges from $10^4$ to $10^8$ ohm/sq, and the charge potential preferably ranges from −500 V to +500 V. The modulus of elasticity at 0.5 percent extension of the magnetic layer preferably ranges from 0.98 to 19.6 GPa (100 to 2,000 kg/mm$^2$) in each in-plane direction. The breaking strength preferably ranges from 98 to 686 MPa (10 to 70 kg/mm$^2$). The modulus of elasticity of the magnetic recording medium preferably ranges from 0.98 to 14.7 GPa (100 to 1500 kg/mm$^2$) in each in-plane direction. The residual elongation is preferably equal to or less than 0.5 percent, and the thermal shrinkage rate at all temperatures below 100° C. is preferably equal to or less than 1 percent, more preferably equal to or less than 0.5 percent, and most preferably equal to or less than 0.1 percent.

The glass transition temperature (i.e., the temperature at which the loss elastic modulus of dynamic viscoelasticity peaks as measured at 110 Hz with a dynamic viscoelastometer, such as RHEOVIBRON) of the magnetic layer preferably ranges from 50 to 180° C., and that of the nonmagnetic layer preferably ranges from 0 to 180° C. The loss elastic modulus preferably falls within a range of $1 \times 10^7$ to $8 \times 10^8$ Pa ($1 \times 10^8$ to $8 \times 10^9$ dyne/cm$^2$) and the loss tangent is preferably equal to or less than 0.2. Adhesion failure tends to occur when the loss tangent becomes excessively large. These thermal characteristics and mechanical characteristics are desirably nearly identical, varying by equal to or less than 10 percent, in each in-plane direction of the medium.

The residual solvent contained in the magnetic layer is preferably equal to or less than 100 mg/m$^2$ and more preferably equal to or less than 10 mg/m$^2$. The void ratio in the coated layers, including both the nonmagnetic layer and the magnetic layer, is preferably equal to or less than 40 volume percent, more preferably equal to or less than 30 volume percent. Although a low void ratio is preferable for attaining high output, there are some cases in which it is better to ensure a certain level based on the object. For example, in many cases, larger void ratio permits preferred running durability in disk media in which repeat use is important.

Physical properties of the nonmagnetic layer and magnetic layer may be varied based on the objective in the magnetic recording medium of the present invention. For example, the modulus of elasticity of the magnetic layer may be increased to improve running durability while simultaneously employing a lower modulus of elasticity than that of the magnetic layer in the nonmagnetic layer to improve the head contact of the magnetic recording medium.

A magnetic recording and reproduction system that reproduces a signal that has been recorded at high density with an anisotropic magnetoresistive head (AMR head) or a giant magnetoresistive head (GMR head) is desirable as the magnetic recording and reproduction system employing the magnetic recording medium of the present invention.

Normally, two units are employed to denote linear recording density: fci and bpi. "fci" denotes the density that is physically recorded on the medium as the number of bit reversals per inch, while "bpi" denotes the number of bits per inch, including signal processing, and is system-dependent. Thus, the fci is normally employed for pure performance evaluation of a medium. The desirable linear recording density range in the course of recording a signal on the magnetic recording medium of the present invention is 100 to 400 kfci, with 175 to 400 kfci being preferred. In systems actually in use, this depends on signal processing, and cannot be determined once and for all. As a general guideline, performance is reflected by an fci of 0.5 to one times the bpi. Thus, a range of 200 to 800 kbpi is desirable, 350 to 800 kbpi being preferred.

The distance between shields (sh-sh) on the reproduction head is, for example, 0.08 to 0.18 micrometer and the reproduction track width is, for example, 0.5 to 3.5 micrometers. GMR heads exploit a magnetoresistive effect corresponding to the magnitude of the magnetic flux on a thin-film magnetic head, affording advantages unachievable with inductive heads, such as attaining high reproduction output levels. This is primarily because there is no dependence on the relative speed between the medium and the head, since the reproduction output of a GMR head is based on change in magnetoresistance. In particular, GMR heads permit an about threefold improvement in reading sensitivity over AMR heads. The use of such a GMR head as the reproduction head permits the reproduction with high sensitivity of signals that have been recorded at high density.

A highly sensitive AMR head can also be employed as the above reproduction head. Generally, the coefficient of magnetoresistance is employed as the indicator of sensitivity of a head. Commonly employed magnetoresistive elements have a coefficient of magnetoresistance of about 2 percent at a thickness of 200 to 300 nm. By contrast, this is about 2 to 5 percent for highly sensitive AMR heads. When employing a highly sensitive AMR head, it is also possible to reproduce with high sensitivity signals that have been recorded on the magnetic recording medium of the present invention to achieve a high S/N ratio.

Use of a GMR head as the reproduction head when the magnetic recording medium of the present invention is a tape magnetic recording medium permits reproduction at a high S/N ratio even when the signal has been recorded in a higher frequency region that is conventionally the case. Accordingly, the magnetic recording medium of the present invention is optimal as a magnetic recording medium in either magnetic tape or disk form for use in high-density recording of computer data.

EXAMPLES

The present invention will be described in greater detail below through Examples. The components, ratios, operations, sequences, and the like indicated here can be modified without departing from the spirit of the present invention, and are not to be construed as being limited to Examples set forth below. The "parts" given in Examples denote mass parts unless specifically indicated otherwise.

Preparation of Magnetic Layer Coating Liquid (Ferromagnetic Powder: BaFe)

| | |
|---|---|
| Ferromagnetic plate-shaped hexagonal ferrite powder<br>Composition other than oxygen (molar ratio):<br>Ba/Fe/Co/Zn = 1/9/0.2/1<br>Hc: 176 kA/m (2200 Oe)<br>Average plate diameter: 20 nm<br>Average plate ratio: 3<br>BET specific surface area: 65 m$^2$/g<br>σs: 49 A · m$^2$/kg (49 emu/g) | 100 parts |
| Polyurethane resin based on branched side chain-comprising polyester polyol/diphenylmethane diisocyanate, —SO$_3$Na = 400 eq/ton | 17 parts |
| α-Al$_2$O$_3$ (particle size: 0.15 micrometer) | 5 parts |
| Diamond powder (average particle diameter: 60 nm) | 1 part |
| Carbon black (average particle diameter: 20 nm) | 1 part |
| Cyclohexanone | 110 parts |
| Methyl ethyl ketone | 100 parts |
| Toluene | 100 parts |
| Butyl stearate | 2 parts |
| Stearic acid | 1 part |

Preparation of Nonmagnetic Layer Coating Liquid

| | |
|---|---|
| Nonmagnetic inorganic powder<br>α-iron oxide<br>Surface treatment layer: Al$_2$O$_3$, SiO$_2$<br>Average major axis length: 0.15 micrometer<br>Tap density: 0.8<br>Average acicular ratio: 7<br>BET specific surface area: 52 m$^2$/g<br>pH: 8<br>DBP oil absorption capacity: 33 g/100 g | 85 parts |
| Carbon black<br>DBP oil absorption capacity: 120 mL/100 g<br>pH: 8<br>BET specific surface area: 250 m$^2$/g<br>Volatile content: 1.5 percent | 15 parts |
| Vinyl chloride resin<br>MR 110 made by Nippon Zeon Co., Ltd. | 10 parts |
| Polyurethane resin based on branched side chain-comprising polyester polyol/diphenylmethane diisocyanate, —SO$_3$Na = 150 eq/ton | 10 parts |
| Phenylphosphonic acid | 3 parts |
| Cyclohexanone | 140 parts |
| Methyl ethyl ketone | 170 parts |
| Butyl stearate | 2 part |
| Stearic acid | 1 part |

Preparation of Backcoat Layer Coating Liquid A

| | |
|---|---|
| Nonmagnetic inorganic powder<br>α-iron oxide<br>Surface treatment layer: Al$_2$O$_3$, SiO$_2$<br>Average major axis length: 0.15 micrometer<br>Tap density: 0.8<br>Average acicular ratio: 7<br>BET specific surface area: 52 m$^2$/g<br>pH: 8<br>DBP oil absorption capacity: 33 g/100 g | 85 parts |
| Carbon black<br>DBP oil absorption capacity: 120 mL/100 g<br>pH: 8<br>BET specific surface area: 250 m$^2$/g<br>Volatile content: 1.5 percent | 20 parts |
| Vinyl chloride resin (MR 104 made by Nippon Zeon Co., Ltd.) | 13 parts |
| Polyurethane resin (Vylon UR8200 made by Toyobo Co., Ltd.) | 6 parts |
| Phenylphosphonic acid | 3 parts |
| Alumina powder (average particle diameter: 0.25 micrometer) | 5 parts |
| Cyclohexanone | 140 parts |
| Methyl ethyl ketone | 170 parts |
| Butyl stearate | 2 part |
| Stearic acid | 1 part |

Preparation of Backcoat Layer Coating Liquid B

| | |
|---|---|
| Carbon black (average particle diameter: 25 nm) | 40.5 parts |
| Carbon black (average particle diameter: 370 nm) | 0.5 part |
| Barium sulfate | 4.05 parts |
| Nitrocellulose | 28 parts |
| SO$_3$Na group-containing polyurethane resin | 20 parts |
| Cyclohexanone | 100 parts |
| Toluene | 100 parts |
| Methyl ethyl ketone | 100 parts |

The various components of the above-described magnetic layer coating liquid, nonmagnetic layer coating liquid, and backcoat layer coating liquid were kneaded for 240 minutes in an open kneader and dispersed in a sand mill (the dispersion times are given in Table 1). To each of the dispersions obtained were added four parts of trifunctional low-molecular-weight polyisocyanate compound (Coronate 3041 made by Nippon Polyurethane Industry Co.), and the mixtures were stirred for another 20 minutes. Subsequently, the mixtures were filtered using a filter having an average pore diameter of 0.5 micrometer. The nonmagnetic layer coating liquid and backcoat layer coating liquid were processed at 3,000 rpm in a centrifugal separator made by Hitachi High Tech (the centrifugal sedimentation times are given in Table 1), and the supernatants were employed to prepare the nonmagnetic layer coating liquid and backcoat layer coating liquid.

The above nonmagnetic coating liquid was coated in a quantity calculated to give a dry thickness of 1.5 micrometers on a nonmagnetic support (PEN, 6 micrometers in thickness, with surface properties given by "Support surface A" (side on which magnetic layer formed) and "Support surface B" (side on which back layer formed) in Table 1) and dried at 100° C. Magnetic layer coating liquid 1 was then coated in a quantity calculated to yield a dry thickness of 60 nm and dried. Backcoat layer coating liquid A was coated to the opposite surface of the support from that on which the magnetic layer had been formed and dried to form a backcoat layer 0.5 micrometer in thickness.

The medium was then processed at a temperature of 100° C. at a linear pressure of 350 kg/cm (343 kN/m) at a speed of 100 m/min with a seven-stage calender comprised only of metal rolls. Subsequently, a heat treatment was conducted for 24 hours at 70° C. and the medium was split to a ½-inch width to prepare the magnetic table of Example 1.

Examples 2 to 9 and Comparative Examples 1 to 9

With the exceptions that the average plate diameter of the hexagonal ferrite contained in the magnetic layer coating liquid, surface roughness of the support employed, dispersion times and centrifugal separation times of the various layer-forming coating liquids, or backcoat layer-forming coating liquids employed were changed as indicated in Table 1, magnetic tapes were prepared in the same manner as in Example 1.

Various tape samples in their initial states and tape samples that had been stored for one week at 60° C. and 10 percent were evaluated by the following methods. The results are given in Table 1.

Measurement Methods

1. Measurement of Electromagnetic Characteristics (i) BB-SNR

Electromagnetic characteristics were measured with a drum tester (relative speed 2 m/s). A write head with Bs=1.7 T and a gap length of 0.2 micrometer was employed to record signals at linear recording densities of 100 kfci (recording wavelength λ=0.504 micrometer, carrier signal 3.937 MHz) and 400 kfci (recording wavelength λ=0.127 micrometer, carrier signal 15.748 MHz) and the signals were reproduced with GMR heads (reproduction track width (Tw): 3.0 micrometers, sh-sh=0.12 micrometer).

The ratios of the 100 k and 400 fci outputs to the integral noise at 0 to 200 kfci and 0 to 400 kfci were measured to obtain the BB-SNR.

(ii) K-SNR

The same recording and reproduction as in the above measurement of the BB-SNR was conducted for the K-SNR. The integral noises of −1 MHz to −0.3 MHz and +0.3 MHz to 1 MHz in the vicinity of the carrier signal were added and the value obtained was employed as the noise value to determine the ratio of output to noise and obtain the K-SNR.

2. Measurement of the Frictional Coefficient

The frictional coefficient of the magnetic layer surface was measured under the following conditions with an ILC-type μ value measuring device.

| Target member | AlTiC rod (diameter = 2 mm, surface roughness Ra = 4 nm) |
|---|---|
| Load | 50 gf |
| Speed | 20 mm/s |

3. Back Surface Winding Appearance (Number of Protruding Portions)

Each tape sample was mounted on an LTO reel and run once over a drive, and the number of protruding portions per roll was counted.

[Table 1]

TABLE 1

| | | Average plate diameter of hexagonal ferrite (nm) | Support surface A | | Support surface B | |
|---|---|---|---|---|---|---|
| | | | AFM Ra(nm) | HD2000 10 μmPSD | AFM Ra(nm) | HD2000 10 μmPSD |
| Example | 1 | 20 | 1.5 | 2000 | 2 | 10000 |
| | 2 | 20 | 0.5 | 1000 | 2 | 10000 |
| | 3 | 20 | 2 | 5000 | 2 | 10000 |
| | 4 | 20 | 1 | 300 | 2 | 10000 |
| | 5 | 20 | 2 | 8000 | 2 | 10000 |
| | 6 | 20 | 1.5 | 2000 | 1.5 | 2000 |
| | 7 | 20 | 1.5 | 2000 | 3 | 40000 |
| | 8 | 10 | 1.5 | 2000 | 2 | 10000 |
| | 9 | 40 | 1.5 | 2000 | 2 | 10000 |
| Comp. Ex. | 1 | 20 | 0.3 | 300 | 2 | 10000 |
| | 2 | 20 | 2 | 5000 | 2 | 10000 |
| | 3 | 20 | 1 | 300 | 2 | 10000 |
| | 4 | 20 | 2 | 8000 | 2 | 10000 |
| | 5 | 20 | 1.5 | 2000 | 1.5 | 2000 |
| | 6 | 20 | 1.5 | 2000 | 3 | 40000 |
| | 7 | 5 | 1.5 | 2000 | 2 | 10000 |
| | 8 | 50 | 1.5 | 2000 | 2 | 10000 |
| | 9 | 20 | 1.5 | 2000 | 2 | 10000 |

| | | Magnetic layer Dispersion time (min.) | Nonmagnetic layer | | Backcoat layer | | |
|---|---|---|---|---|---|---|---|
| | | | Dispersion time (min.) | Centrifugal separation (min.) | Formula | Dispersion time (min.) | Centrifugal separation (min.) |
| Example | 1 | 720 | 720 | 60 | A | 720 | 60 |
| | 2 | 1080 | 1080 | 75 | A | 720 | 60 |
| | 3 | 480 | 480 | 45 | A | 720 | 60 |
| | 4 | 1080 | 1080 | 75 | A | 720 | 60 |
| | 5 | 720 | 720 | 60 | A | 720 | 60 |
| | 6 | 720 | 720 | 60 | A | 1080 | 75 |
| | 7 | 720 | 720 | 60 | A | 480 | 45 |
| | 8 | 720 | 720 | 60 | A | 720 | 60 |
| | 9 | 720 | 720 | 60 | A | 720 | 60 |
| Comp. Ex. | 1 | 1080 | 1080 | 75 | A | 720 | 60 |
| | 2 | 360 | 360 | 30 | A | 720 | 60 |
| | 3 | 1440 | 1440 | 90 | A | 720 | 60 |
| | 4 | 600 | 600 | 0 | A | 720 | 60 |
| | 5 | 720 | 720 | 60 | A | 720 | 60 |
| | 6 | 720 | 720 | 60 | A | 300 | 0 |

TABLE 1-continued

| | | | | | | | |
|---|---|---|---|---|---|---|---|
| | 7 | 720 | 720 | 60 | A | 720 | 60 |
| | 8 | 720 | 720 | 60 | A | 720 | 60 |
| | 9 | 720 | 720 | 60 | B | 720 | 0 |

| | | Initial state | | | |
|---|---|---|---|---|---|
| | | Magnetic layer | Back | Magnetic layer | Back surface winding appearance |
| | | AFM Ra(nm) | HD2000 10 μmPSD | HD2000 10 μmPSD | frictional coefficient (μvalue) | (Number of protruding portions) |
| Example | 1 | 1.5 | 3000 | 40000 | 0.35 | 0 |
| | 2 | 0.5 | 1500 | 40000 | 0.45 | 0 |
| | 3 | 2.5 | 7000 | 40000 | 0.25 | 0 |
| | 4 | 1 | 800 | 40000 | 0.45 | 0 |
| | 5 | 2 | 10000 | 40000 | 0.2 | 0 |
| | 6 | 1.5 | 3000 | 20000 | 0.35 | 0 |
| | 7 | 1.5 | 3000 | 80000 | 0.35 | 0 |
| | 8 | 1.4 | 2500 | 40000 | 0.38 | 0 |
| | 9 | 1.7 | 3500 | 40000 | 0.32 | 0 |
| Comp. Ex. | 1 | 0.3 | 800 | 40000 | Sticking(x) | 0 |
| | 2 | 2.8 | 7000 | 40000 | 0.2 | 0 |
| | 3 | 0.8 | 500 | 40000 | 0.7 | 0 |
| | 4 | 2.2 | 12000 | 40000 | 0.18 | 0 |
| | 5 | 1.5 | 3000 | 10000 | 0.35 | 4(x) |
| | 6 | 1.5 | 3000 | 100000 | 0.35 | 0 |
| | 7 | 1.8 | 5000 | 40000 | 0.33 | 0 |
| | 8 | 2 | 6000 | 40000 | 0.27 | 0 |
| | 9 | 1.5 | 3000 | 300000 | 0.35 | 0 |

| | | Initial state Electromagnetic characteristics | | | |
|---|---|---|---|---|---|
| | | SNR(100 kfci) (dB) | K-SNR(100 Kfci) (dB) | SNR(400 kfci) (dB) | K-SNR(400 Kfci) (dB) |
| Example | 1 | 4.6 | 4 | 9 | 8 |
| | 2 | 8.6 | 5.5 | 16 | 11 |
| | 3 | 1.5 | 1 | 3 | 2 |
| | 4 | 6.6 | 7 | 14 | 14 |
| | 5 | 3 | −1 | 6 | −2 |
| | 6 | 4.6 | 4 | 9 | 8 |
| | 7 | 4.6 | 4 | 9 | 8 |
| | 8 | 5.5 | 5 | 11 | 10 |
| | 9 | 4 | 4 | 8 | 8 |
| Comp. Ex. | 1 | Measurement was impossible. (x) | Measurement was impossible. (x) | Measurement was impossible. (x) | Measurement was impossible. (x) |
| | 2 | 0(x) | 0 | 0(x) | 0 |
| | 3 | Measurement was impossible. (x) | Measurement was impossible. (x) | Measurement was impossible. (x) | Measurement was impossible. (x) |
| | 4 | 0.5 | −5(x) | 1 | −10(x) |
| | 5 | 4.6 | 4 | 9 | 8 |
| | 6 | 4 | 4 | 8 | 8 |
| | 7 | −1(x) | 2 | −2(x) | 4 |
| | 8 | 0(x) | 1 | 0(x) | 2 |
| | 9 | 4 | 4 | 8 | 8 |

| | | Following storage at 60° C. dry - 1 week Electromagnetic characteristics(Difference between before and after storage) | | | |
|---|---|---|---|---|---|
| | | SNR(100 kfci) (dB) | K-SNR(100 Kfci) (dB) | SNR(400 kfci) (dB) | K-SNR(400 Kfci) (dB) |
| Example | 1 | 3.6 | 2.5 | 7 | 5 |
| | 2 | 7.6 | 4 | 14 | 8 |
| | 3 | 0.5 | −0.5 | 1 | −1 |
| | 4 | 5.6 | 6 | 12 | 12 |
| | 5 | 2 | −2 | 4 | −4 |
| | 6 | 4.6 | 3.5 | 9 | 7 |
| | 7 | 3.1 | 1 | 6 | 2 |
| | 8 | 4.5 | 3.5 | 9 | 7 |
| | 9 | 3 | 2.5 | 6 | 5 |
| Comp. Ex. | 1 | Measurement was impossible. (x) | Measurement was impossible. (x) | Measurement was impossible. (x) | Measurement was impossible. (x) |
| | 2 | −1.5(x) | −4(x) | −3(x) | −8(x) |
| | 3 | Measurement was impossible. (x) | Measurement was impossible. (x) | Measurement was impossible. (x) | Measurement was impossible. (x) |
| | 4 | −1 | −8(x) | −2 | −16(x) |
| | 5 | 4.1 | 4 | 8 | 8 |

TABLE 1-continued

| | | | | |
|---|---|---|---|---|
| 6 | 2 | −4(x) | 4 | −7(x) |
| 7 | −2(x) | −1 | −4(x) | −2 |
| 8 | −1(x) | −3 | −2(x) | −6 |
| 9 | 1 | −11(x) | 2 | −17(x) |

Evaluation Results

As shown in Table 1, it was possible to keep the magnetic layer Ra to within a range of 0.5 to 2.5 nm, the magnetic layer surface PSD (10 micrometers) to within a range of 800 to 10,000 nm³, and the backcoat layer PSD (10 micrometers) to within a range of 20,000 to 80,000 nm³ by subjecting the magnetic layer coating liquid, nonmagnetic layer coating liquid, and backcoat coating liquid to a high degree of dispersion processing and grading (Examples 1 to 9). In Examples 1 to 9, in which the magnetic layer and backcoat layer roughness and waviness were controlled as set forth above, the electromagnetic characteristics changed little following storage. Both the winding appearance and frictional coefficient evaluation results were good.

By contrast, in Comparative Example 1, an excessively low magnetic layer surface Ra caused an increase in the frictional coefficient and sticking occurred during running. Thus, it proved impossible to measure the electromagnetic characteristics.

In Comparative Example 2, an excessively high magnetic layer surface Ra caused a drop in output, resulting in a drop in the S/N ratio.

In Comparative Example 3, an excessively low magnetic layer surface PSD (10 micrometers) caused a high frictional coefficient, resulting in sticking during running. Thus, it proved impossible to measure the electromagnetic characteristics.

In Comparative Example 4, an excessively high magnetic layer surface PSD (10 micrometers) caused an increase in noise and a drop in the K-SNR.

In Comparative Example 5, the backcoat layer surface PSD (10 micrometers) was low and smoothness was excessively high, resulting in deterioration of the winding appearance and numerous protruding portions.

In Comparative Examples 6 and 9, an excessively high backcoat layer surface PSD (10 micrometers) caused transfer following storage, resulting in an increase in noise and a drop in the K-SNR. In Comparative Example 9 in particular, the K-SNR dropped due to transfer following storage.

In Comparative Example 7, an excessively small particle size in the hexagonal ferrite powder made it impossible to ensure output and the S/N ratio dropped.

In Comparative Example 8, an excessively large particle size in the hexagonal ferrite powder increased noise and caused the S/N ratio to drop.

The magnetic recording medium of the present invention is suitable for use as a magnetic recording medium for high density recording.

The invention claimed is:

1. A magnetic recording medium comprising a magnetic layer comprising a hexagonal ferrite powder and a binder on one surface of a nonmagnetic support and a backcoat layer on the other surface of the nonmagnetic support, wherein
    a power spectrum density at a pitch of 10 micrometers ranges from 800 to 10,000 nm³ on the magnetic layer surface,
    a power spectrum density at a pitch of 10 micrometers ranges from 20,000 to 80,000 nm³ on the backcoat layer surface,
    the magnetic layer has a center surface average surface roughness Ra, as measured by an atomic force microscope, ranging from 0.5 to 2.5 nm, and
    the hexagonal ferrite powder has an average plate diameter ranging from 10 to 40 nm.

2. The magnetic recording medium according to claim 1, which is employed in a magnetic signal reproduction system employing a giant magnetoresistive magnetic head as a reproduction head.

3. A magnetic signal reproduction system, comprising:
    the magnetic recording medium according to claim 1, and
    a reproduction head in the form of a giant magnetoresistive magnetic head.

4. A magnetic signal reproduction method, reproducing magnetic signals that have been recorded on the magnetic recording medium according to claim 1 with a giant magnetoresistive magnetic head.

* * * * *